June 25, 1968   D. S. GIARDINI   3,389,797

FILTERING SYSTEM HAVING DUAL CLEANING MEANS

Filed Dec. 20, 1965

INVENTOR.
DANTE S. GIARDINI
BY Ernest J. N.
ATTORNEY

United States Patent Office

3,389,797
Patented June 25, 1968

3,389,797
FILTERING SYSTEM HAVING DUAL CLEANING MEANS
Dante S. Giardini, Dayton, Ohio, assignor to The Bendix Corporation, a corporation of Delaware
Filed Dec. 20, 1965, Ser. No. 514,896
1 Claim. (Cl. 210—138)

ABSTRACT OF THE DISCLOSURE

An improved filtering system which provides a continuous uninterrupted supply of filtered liquid downstream of the filter and includes dual co-acting filter cleaning operations which do not effect the downstream filtered liquid discharge flow. Upstream cleaning means provide a flow path traversing the upstream side of the filter element wherein fluid flow continually washes and cleans the upstream surface of the filter during operation. Downstream cleaning means provide a periodic back flow through the filter element and at the same time maintains a constant flow at the discharge outlet.

---

This invention generally pertains to a filtering system and more particularly to a filtering system for filtering foreign matter from liquids while simultaneously cleaning the filter element without affecting the rate of flow at the discharge outlet.

The industrial machine tool industry is illustrative of those industries where reliable, uninterrupted filtering is critical. Contaminated coolant can result in the end product being marred or spoiled. Interruptions in machine operation for filter changes are obviously costly.

Replaceable cartridge or backwash filters are commonly used in the machine tool and other industries. Neither type has completely fulfilled the needs of industry.

Generally in the replaceable cartridge filter systems, a series of such filters ranging from coarse to fine are used. As each filter clogs up, the machine must be shut down, the filters drained, and the dirty cartridge removed and replaced. The down time required to replace the cartridge may run from one to three hours. During this down period, the machine is non-productive resulting in increased overhead cost which will raise the ultimate cost of the end product.

The backwash type filter is an attempt ot reduce machine down time due to replacing cartridges. However, backwash filters generally incorporate a number of moving parts in the system. Either additional pumps are required to cause a reverse flow backwash in the filter; or the backwash vanes, internal motors, etc. are fluid actuated and a high inlet pressure is needed to provide the energy for operating the backwash apparatus. Although the backwash filter has less frequent down periods than the cartridge filters; a backwash filter malfunction will result in a much longer down period because of the number of additional moving elements in the backwash filters.

Accordingly it is an object of this invention to provide a filtering system which will reduce system shutdowns due to filter replacement or repair.

It is another object of this invention to provide continuous filtering system which incorporates a continuous filter cleaning means and backwash cleaning means which operate while the filter unit is installed in its operating environment to provide filter cleaning without detaching such filter from its associated structure nor interrupting the outflow of filtered liquid.

A further object of this invention is to provide a filtering system incorporating filter cleaning means and backwash means wherein the system has no moving operating parts which are subject to critical wear.

Another object of this invention is to provide a filtering system which operates in the low pressure range and has a permanent type filter element which is continuously cleaned by the flow of the contaminated fluid and is further cleaned by aperiodic reverse flow of filtered liquid through the filter element while maintaining a constant discharge of filtered liquid at a discharge outlet.

Figure 1:
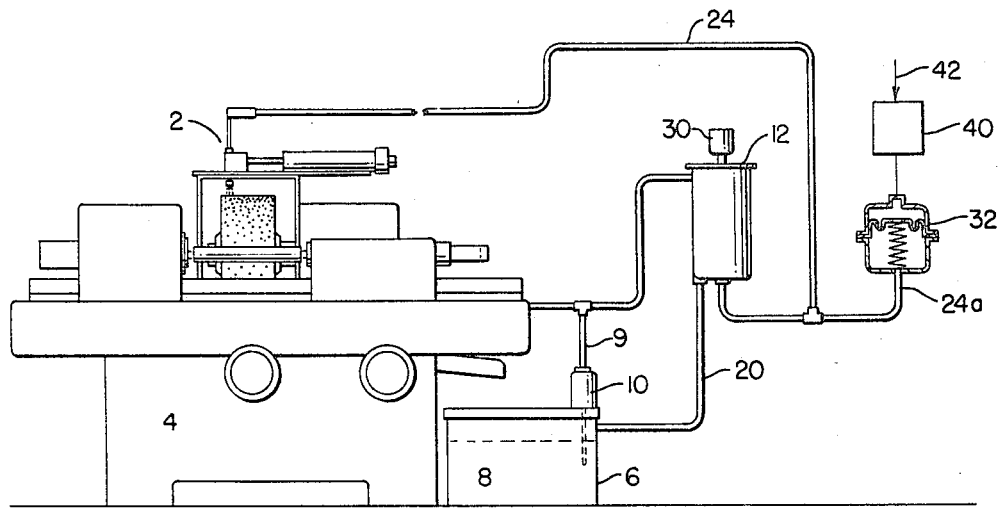
Figure 2:
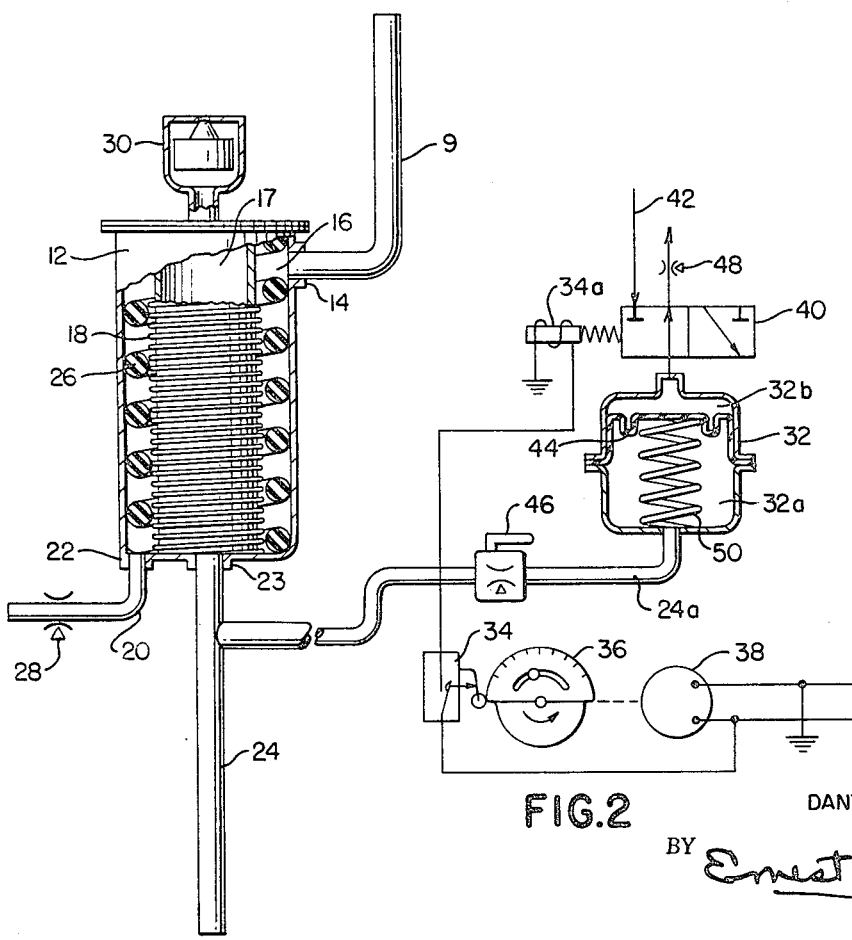

Other objects and advantages of the invention will be apparent from the following description, the appended claim, and the accompanying drawings, in which, FIG. 1 shows an exemplary embodiment of the invention as applied to an industrial machine, and FIG. 2 illustrates the filtering system and filter cleaning means.

This invention may be used in many applications where it is desired to furnish a continuous uninterrupted flow of filtered liquid at a given discharged outlet. The fields of industrial machine tool cutting and grinding coolants, both oil and water base, chemical processing, and recirculating systems are examples of a few of the many fields where this invention may be applied.

The invention will now be described as applied in an illustrative embodiment as shown in FIG. 1 wherein filtered liquid is required to be supplied to a grinding wheel cleaner 2, described in Giardini et al. Patent 3,167,893, secured to a grinder shown generally at 4. In this embodiment, a standard low pressure pump 10 supplies the necessary coolant 8 from reservoir 6 through conduit 9 to both the grinder and the wheel cleaner. Reservoir 6 also recovers the coolant and waste material from the grinding machine and from the filtering system, to be described herebelow, so that the same coolant may be continuously reused.

The features of the filtering system are best shown in FIG. 2 in which a filter unit 12 receives coolant 8 at its inlet port 14 through conduit 9 from the reservoir 6. An inner filter element 18 forms an upstream chamber 16 and downstream chamber 17 within filter unit 12. A conduit 20, connected to a first outlet port 22 which is associated with upstream chamber 16, returns non-filtered coolant and filtered out material to reservoir 6. Conduit 24, associated with the downstream chamber 17, carries the filtered fluid from downstream chamber outlet port 23 to the discharge outlet at wheel cleaner 2.

Filter element 18 is of the permanent class of filters and is shown in this embodiment as being a wire wound element. The spacing of the wires will vary depending on the requirements of the filtering system. Although a wire wound filter element is shown and described, other permanent type filters may be used. For example, element 18 could as easily be a cylindrical metallic element having sufficient holes drilled therein to supply the filtering needed.

A continuous ring 26 is placed in upstream chamber 16 and engages both the casing 12 and filter element 18. Ring 26 is made of rubber or a similar material and extends from adjacent one end of the upstream chamber to the opposite end of said chamber in a helical path. Ring 26, which engages both casing 12 and filter element 18, thus makes the upstream chamber into a continuous constant width flow path which traverses filter element 18 from one end to the opposite end. The reduced cross sectional area of the flow path provides for a higher velocity of fluid flow at any given point in the upstream chamber 16 thus tending to wash filtered out material from the surface of filter element 18 and also to carry away the suspended filtered particles in the upstream chamber to port 22 which are then carried to reservoir 6 through conduit 20. Restriction 28 is used to adjust the filter purging flow rate to increase or decrease the force and velocity of the unfiltered liquid in the constant width flow path in the upstream chamber and thereby provide a proper cleaning of the filter element 18 and carrying away to the first outlet port 22 and then to reservoir 6.

An air bleed 30 is used with filter unit 12 and is connected with the downstream chamber 17. This air bleed can be any typical valve which will allow air to escape from the downstream chamber and automatically seat itself if the filtered fluid rises up into the valve. The use of the air bleed insures that no air will build up in the filter unit to reduce the effective filtering area of the filter element.

A second means for cleaning filter element 18, by causing a reverse filtered fluid flow through filter element 18, comprises an accumulator 32 connected to the downstream filtered fluid by conduit 24a and suitable means for discharging accumulator 32. The discharge means shown in the illustrative embodiment of FIG. 2 comprise a timing device having a cam actuated switch 34, a cam 36 and motor 38 to rotate cam 36; a suitable valve 40 operated by switch 34 through solenoid 34a; and a pressure source 42.

Accumulator 32 has two chambers 32a and 32b separated by a diaphragm 44 or other suitable piston like element. Chamber 32a is connected to the downstream flow of filtered fluid by conduit 24a which also passes through a flow rate control valve 46, thus allowing filtered fluid to accumulate in chamber 32a at a rate fixed by adjusting valve 46. This rate will vary depending on how often it is desired to backflush and the cycle time of the timing device.

Chamber 32b is selectively connected to atmosphere and the pressure source through valve 40. In the position shown, chamber 32b is vented to atmosphere through restriction 48 thus allowing filtered fluid to enter chamber 32a. Spring 50 assists in raising diaphragm 44 when the pressure in chamber 32b is vented to atmosphere.

When the timing device has cycled once, switch 34 is actuated by cam 36 and causes solenoid 34a to shift valve 40. Chamber 32b thus becomes connected to pressure source 42 and receives a higher pressure than the pressure of the filtered liquid in chamber 32a. This pressure unbalance causes diaphragm 44 to move downwardly and forces the filtered liquid in chamber 32a back into the downstream side of the filter system at a pressure greater than the pressure in the filter system. At the end of the discharge cycle, switch 34 is de-energized and valve 40 shifts so that chamber 32b is again vented to atmosphere allowing filtered fluid to again accumulate in chamber 32a.

The discharged fluid from chamber 32a has a pressure greater than the fluid pressure in the filter system and since wheel cleaner 2 has a restricted outlet and only takes a certain amount of filtered liquid at any given time, there is a reverse flow of fluid through the filter element 18 while maintaining a constant uninterrupted discharge at the discharge outlet in cleaner 2.

The force of the reverse fluid flow will discharge foreign material which had become lodged in the filter element and resisted the cleaning action of the fluid flow through the constant width flow path in upstream chamber 16 previously described. This dislodged foreign material will be forced out into the upstream chamber by the reverse flow of the filtered fluid. The flushed out foreign material is then carried to outlet port 22 by the force and velocity of the fluid in the constant width flow path in the upstream chamber. Thus this unique interrelationship between periodic reverse flow and helical flow path cooperates for optimum filtering. Flow at the discharge outlet at wheel cleaner 2 is never interrupted during the backflush cleaning since filtered fluid is accumulated in chamber 32a and discharged back into the system.

Thus it is seen that a filtering system is provided wherein down time and maintenance is eliminated by doing away with the filter element changeover and the system is effective at low pressures since no motors or pumps are used to cause backwashing of the filter element. The combined cleaning apparatus provides an efficient and economical continuous filtering system wherein the filtered fluid discharge is not interrupted during filter cleaning periods since the filter element is being continuously cleaned even during the filtering operation.

While the forms of apparatus herein described constitute preferred embodiments of the invention, it is to be understood that the invention is not limited to these precise forms of apparatus and that changes may be made therein without departing from the scope of the invention which is defined in the appended claim.

What is claimed is:

1. An unfiltered liquid filtering system providing a continuous uninterrupted supply of filtered liquid downstream of the filter and filter cleaning and backflush operations which do not effect the downstream discharge outlet flow comprising, a filter unit, supply means for delivering a continuous flow of unfiltered liquid to said filter unit, said filter unit including, an outer casing, an inner filter element forming the first and second liquid chambers upstream and downstream of said filter element within said casing, an inlet port and first outlet port connected to said casing upstream of said filter element in constant free open communication with respective ends of said first chamber, said chamber providing an uninterrupted continuous flow path therebetween, an open unobstructed conduit between said supply means and said inlet port providing a continuous flow of unfiltered liquid to said first chamber and continuously through said chamber to said first outlet port, a continuously open discharge conduit connected to said outlet port and terminating at a discharge outlet providing a continuous discharge of unfiltered liquid from said first chamber, first cleaning means upstream of said filter element between said inlet and said first outlet port providing a continuous controlled flow of unfiltered liquid along the upstream side of said filter element from said inlet port to said first outlet port thereby continuously and uninterruptedly cleaning said filter element and removing foreign matter from said first chamber during filter operation for continuous discharge therefrom through said first outlet port, and a second outlet port connected to said casing downstream of said filter in constant free open communication with said second chamber, an open unobstructed discharge conduit connected to said second outlet port and terminating at a discharge outlet providing continuous delivery of filtered liquid through said conduit to a desired discharge point, second cleaning means downstream of said filter element connected to said filtered liquid discharge conduit between its ends providing periodic reverse filtered fluid flow through said filter element from said second fluid chamber to said first fluid chamber and simultaneously through both said unfiltered and filtered liquid discharge outlets, said second cleaning means comprising a filtered liquid expansionable chamber accumulator, an open conduit in continuous communication between said accumulator and said filtered liquid discharge conduit between its ends, means associated with said expansionable chamber accumulator providing filtered liquid accumulation therein at a rate not to starve said filtered liquid discharge outlet, actuating means associated with said expansionable chamber accumulator providing a filtered liquid discharge therefrom sufficient for backflushing through said filter element while simultaneously ensuring a continuous constant discharge of filtered fluid at said filtered liquid discharge outlet, and timing means and externally energized discharge means controlled thereby for periodically discharging said accumulator for backflushing against the uinterrupted flow through said inlet port, said system ports and conduits being open and so arranged and constructed that there is continuous flow in all operating modes of said filtering system.

References Cited

UNITED STATES PATENTS

| | | | |
|---|---|---|---|
| 1,272,052 | 7/1918 | Kennicott | 210—120 |
| 2,338,417 | 1/1944 | Forrest et al. | 210—412 |
| 2,383,672 | 8/1945 | Neisingh | 210—410 |
| 280,828 | 7/1883 | Howes | 210—412 |
| 3,043,431 | 7/1962 | Dudley et al. | 210—138 X |

FOREIGN PATENTS

| | | |
|---|---|---|
| 157,627 | 12/1939 | Austria. |
| 1,196,914 | 6/1959 | France. |
| 1,213,694 | 11/1959 | France. |
| 1,330,237 | 5/1963 | France. |
| 589,816 | 9/1945 | Great Britain. |
| 764,578 | 12/1956 | Great Britain. |

SAMIH N. ZAHARNA, *Primary Examiner.*

REUBEN FRIEDMAN, *Examiner.*

F. A. SPEAR, *Assistant Examiner.*